(12) United States Patent
Araki et al.

(10) Patent No.: US 12,362,618 B2
(45) Date of Patent: Jul. 15, 2025

(54) INSULATOR, STATOR, AND ROTATING ELECTRIC MACHINE

(71) Applicant: Toshiba Industrial Products and Systems Corporation, Kawasaki (JP)

(72) Inventors: Takashi Araki, Mie-gun (JP); Motoyasu Mochizuki, Mie-gun (JP); Masaaki Matsumoto, Mie-gun (JP)

(73) Assignee: Toshiba Industrial Products and Systems Corporation, Kawasaki (JP)

( * ) Notice: Subject to any disclaimer, the term of this patent is extended or adjusted under 35 U.S.C. 154(b) by 241 days.

(21) Appl. No.: 17/999,507

(22) PCT Filed: Apr. 28, 2021

(86) PCT No.: PCT/JP2021/016896
§ 371 (c)(1),
(2) Date: Nov. 21, 2022

(87) PCT Pub. No.: WO2021/251022
PCT Pub. Date: Dec. 16, 2021

(65) Prior Publication Data
US 2023/0238848 A1    Jul. 27, 2023

(30) Foreign Application Priority Data
Jun. 11, 2020   (JP) .................. 2020-101680

(51) Int. Cl.
*H02K 3/34*    (2006.01)
*H02K 3/52*    (2006.01)

(52) U.S. Cl.
CPC .............. *H02K 3/345* (2013.01); *H02K 3/34* (2013.01); *H02K 3/522* (2013.01); *H02K 2203/12* (2013.01)

(58) Field of Classification Search
CPC .......... H02K 3/34; H02K 3/345; H02K 3/522; H02K 3/28; H02K 3/325; H02K 2203/12;
(Continued)

(56) References Cited

U.S. PATENT DOCUMENTS

| 6,975,056 | B2 | 12/2005 | Okada et al. | |
| 9,419,487 | B2* | 8/2016 | Yazaki | H02K 3/28 |
| 2014/0028143 | A1* | 1/2014 | Ishigami | H02K 3/18 |
| | | | | 310/208 |

FOREIGN PATENT DOCUMENTS

| JP | 2004-312795 A | 11/2004 |
| JP | 2006-320167 A | 11/2006 |

(Continued)

OTHER PUBLICATIONS

Hishida et al., Insulator and Stator and Motor Comprising Same, Jul. 25, 2019, Panasonic IP, WO 2019142589 (English Machine Translation) (Year: 2019).*

(Continued)

*Primary Examiner* — Alexander A Singh
(74) *Attorney, Agent, or Firm* — Oblon, McClelland, Maier & Neustadt, L.L.P.

(57) ABSTRACT

An insulator according to an embodiment is attached to teeth extending from one side surface in a radial direction of a ring-shaped stator core in the radial direction. The insulator ensures insulation between the teeth and a rectangular wire wound around the teeth with a number of windings. The insulator includes an end-surface cover portion, two side-surface cover portions, a first wall portion, a second wall portion, a protruding-stripe portion, and a recess. The end-surface cover portion covers an end surface of the teeth in an axial direction. The two side-surface cover portions cover both side surfaces of the teeth in a circumferential direction. At one side-surface cover portion of the two side-surface cover portions, a first winding of the rectangular wire is (Continued)

disposed, the rectangular wire is wound around the teeth with a number of windings, and the protruding-stripe portion and the recess are formed.

8 Claims, 6 Drawing Sheets

(58) Field of Classification Search
CPC ...... H02K 1/148; H02K 2203/09; H02K 3/18; H02K 2213/03
USPC .................................. 310/216.105, 214, 215
See application file for complete search history.

(56) References Cited

FOREIGN PATENT DOCUMENTS

| | | | |
|---|---|---|---|
| JP | 2008-148515 | A | 6/2008 |
| JP | 2009118574 | A * | 5/2009 |
| JP | 2010-136480 | A | 6/2010 |
| JP | 2015-133808 | A | 7/2015 |
| JP | 2017-188982 | A | 10/2017 |
| WO | WO-2019142693 | A1 * | 7/2019 |

OTHER PUBLICATIONS

Morishita et al., Winding Structure of Rotating Electrical Machine, May 28, 2009, JP 2009118574 (English Machine Translation) (Year: 2009).*
Extended European Search Report issued Jun. 27, 2024 in European Patent Application No. 21822266.9, 10 pages.
Office Action issued Mar. 12, 2024, in corresponding Japanese Patent Application No. 2022-530058 (with English Translation), 12 pages.
International Search Report mailed on Jul. 27, 2021 in PCT/JP2021/016896 filed on Apr. 28, 2021 (4 pages).

* cited by examiner

INSULATOR, STATOR, AND ROTATING ELECTRIC MACHINE

CROSS-REFERENCE TO RELATED APPLICATION

This is the U.S. National Phase Application under 35 U.S.C. § 371 of International Patent Application No. PCT/JP2021/016896 filed Apr. 28, 2021, which designated the United States and was published in a language other than English, which claims the benefit of Japanese Patent Application No. 2020-101680 filed Jun. 11, 2020, both of them are incorporated by reference herein. The International Application was published in Japanese on Dec. 16, 2021 as WO2021/251022 A1 under PCT Article 21(2).

TECHNICAL FIELD

Embodiments of the present invention relate to an insulator, stator, and a rotating electric machine.

BACKGROUND ART

A rotating electric machine including a stator and a rotor is known. For example, the stator includes a circular-ring-shaped stator core, teeth protruding from an inner peripheral surface of the stator core in a radially inward direction, a coil wound around the teeth, and an insulator attached to the teeth and used to ensure insulation between the teeth and the coil. The insulator includes, for example, a cover that covers a periphery of the teeth, and a wall portion that is provided upright from both sides of the cover in a radial direction. A coil is accommodated in a recess formed of the cover and the wall portion.

For example, the rotor includes a column-shaped rotor core rotatably disposed in the inner side of the stator in the radial direction and a magnet provided on the rotor core.

With such a configuration, when an electrical current is supplied to the coil, an interlinkage magnetic flux is generated at each of the teeth. A magnetic suction force or a magnetic repulsion force is generated between the interlinkage magnetic flux and the magnet of the rotor, and the rotor rotates.

Here, when winding the coil around the teeth with the insulator interposed therebetween, there is a case in which a space factor of the coil is degraded due to deformation of the winding shape of the coil. Consequently, various techniques have been proposed in order to prevent the deformation of the winding shape of the coil.

For example, in a case of using a round wire as the coil, a technique of forming, on the cover of the insulator, grooves each having a semicircular shape corresponding to a shape of the round wire side by side in a radial direction is disclosed. Since the coil is accommodated in the grooves, displacement of the coil on the insulator is prevented, and as a result, it is possible to prevent deformation of the winding shape of the coil.

However, in order to improve a space factor of the coil, a rectangular wire may be used as the coil instead of the round wire. Since a gap between the coils can be reduced as small as possible by using the rectangular wire, it is possible to improve a space factor of the coil.

However, in the case of using a rectangular wire as the coil, grooves to be formed on the insulator are also each formed in a square shape. Therefore, since the grooves are attempted to be formed side by side in the radial direction, it is necessary to form a gap between the grooves adjacent to each other. Consequently, as a result, there is a possibility that a space factor of the coil is degraded.

Furthermore, in a case of attempting to form a square-shaped groove, it is difficult to ensure a thickness of the insulator as compared with a semicircular-shaped groove. In a case of attempting to form an insulator with an increased thickness by an amount of a difference in the thickness of the above-described insulator, there is a possibility that an insulation distance between the teeth and the coil is wastefully longer and a space factor of the coil is degraded.

CITATION LIST

Patent Literature

[Patent Literature 1] Japanese Unexamined Patent Application, First Publication No. 2015-133808

SUMMARY OF THE INVENTION

Problems to be Solved by the Invention

The invention that solves the problem provides an insulator, a stator, and a rotating electric machine which can prevent deformation of the winding shape of the coil and can improve a space factor of the coil in a case of using a rectangular wire as a coil.

Means for Solving the Problems

An insulator according to an embodiment is attached to teeth extending from one side surface in a radial direction of a ring-shaped stator core in the radial direction. The insulator according to the embodiment ensures insulation between the teeth and a rectangular wire wound around the teeth with a number of windings. The insulator according to the embodiment includes an end-surface cover portion, two side-surface cover portions, a first wall portion, a second wall portion, a protruding-stripe portion, and a recess. The end-surface cover portion covers an end surface of the teeth in an axial direction. The two side-surface cover portions cover both side surfaces of the teeth in a circumferential direction. The first wall portion is provided upright from one end of the radial direction of the end-surface cover portion and the two side-surface cover portions. The second wall portion is provided upright from the other end of the radial direction of the end-surface cover portion and the two side-surface cover portions. The protruding-stripe portion is formed to protrude from at least one of a side edge of the first wall portion and a side edge of the second wall portion, and extends in the axial direction. The recess is formed across the protruding-stripe portion and the end-surface cover portion, and accommodates the rectangular wire. At one side-surface cover portion of the two side-surface cover portions, a first winding of the rectangular wire is disposed, the rectangular wire is wound around the teeth with a number of windings, and the protruding-stripe portion and the recess are formed.

EMBODIMENTS FOR CARRYING OUT THE INVENTION

Hereinafter, a rotating electric machine according to an embodiment will be described with reference to the drawings.

Figure 1:
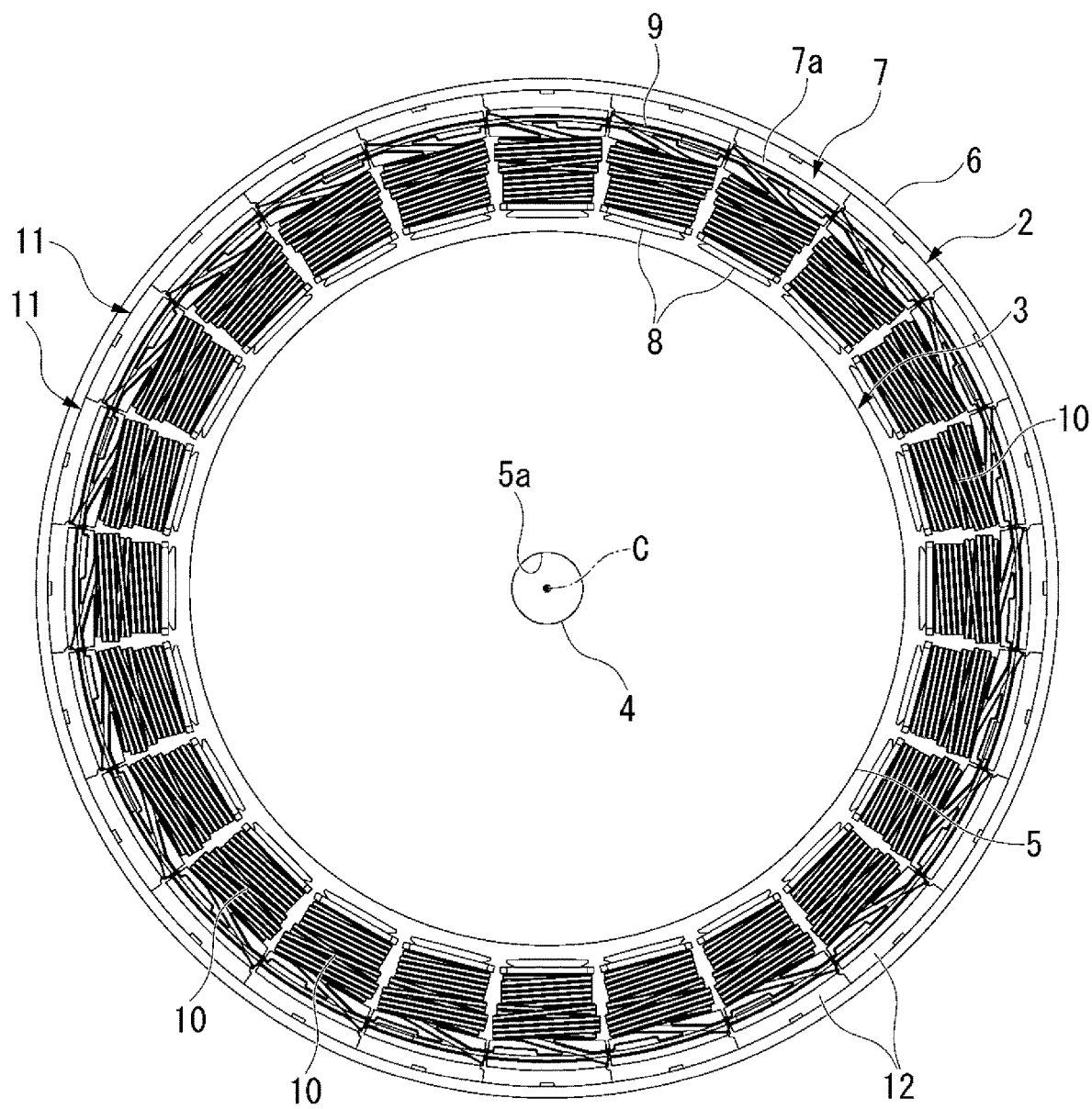
FIG. 1 is a plan view showing a rotating electric machine according to an embodiment.

FIG. 1 is a plan view showing a rotating electric machine 1.

The rotating electric machine 1 includes: a cylindrical stator 2; and a rotor 3 that is disposed in the inner side of the stator 2 in the radial direction and is rotatably provided with respect to the stator 2.

In the following description, a direction parallel to a rotation axis C of the rotor 3 is referred to as an axial direction, a rotation direction of the rotor 3 is referred to as a circumferential direction, and a radial direction of the rotor 3 orthogonal to the axial direction and the circumferential direction is simply referred to as a radial direction.

The rotor 3 includes: a shaft 4 that rotates around the rotation axis C; and a rotor core 5 that is fitted onto an outer peripheral surface of the shaft 4. A through-hole 5a that penetrates through the rotor core 5 in the axial direction is formed at a center in the radial direction. The shaft 4 is fixed to the through-hole 5a by, for example, press-fitting. A plurality of magnets, which are not shown in the drawings, are arranged in the circumferential direction and are provided near the outer-periphery portion of the rotor core 5.

The stator 2 is fixed to and fitted into an inner peripheral surface of a cylindrical stator casing 6. The axial directions of the stator casing 6 and the stator 2 coincide with the rotation axis C. The stator 2 includes: a cylindrical stator core 7; a plurality of teeth 8 (for example, 24 in the embodiment) formed to protrude from an inner peripheral surface 7a of the stator core 7 in a radially inward direction; an insulator 9 that has insulation property and is attached so as to cover the periphery of the teeth 8; and a coil 10 wound around the insulator 9 of each of the teeth 8 by a concentrated winding method.

Here, a system is adopted in which the stator 2 is separable in the circumferential direction. That is, the stator 2 is configured such that split stators 11 separated in the circumferential direction for each of the teeth 8 are coupled in a ring form. In the embodiment, the number of the split stators 11 is twenty-four. In other words, in the embodiment, the stator 2 is configured of twenty-four split stators 11.

Figure 2:
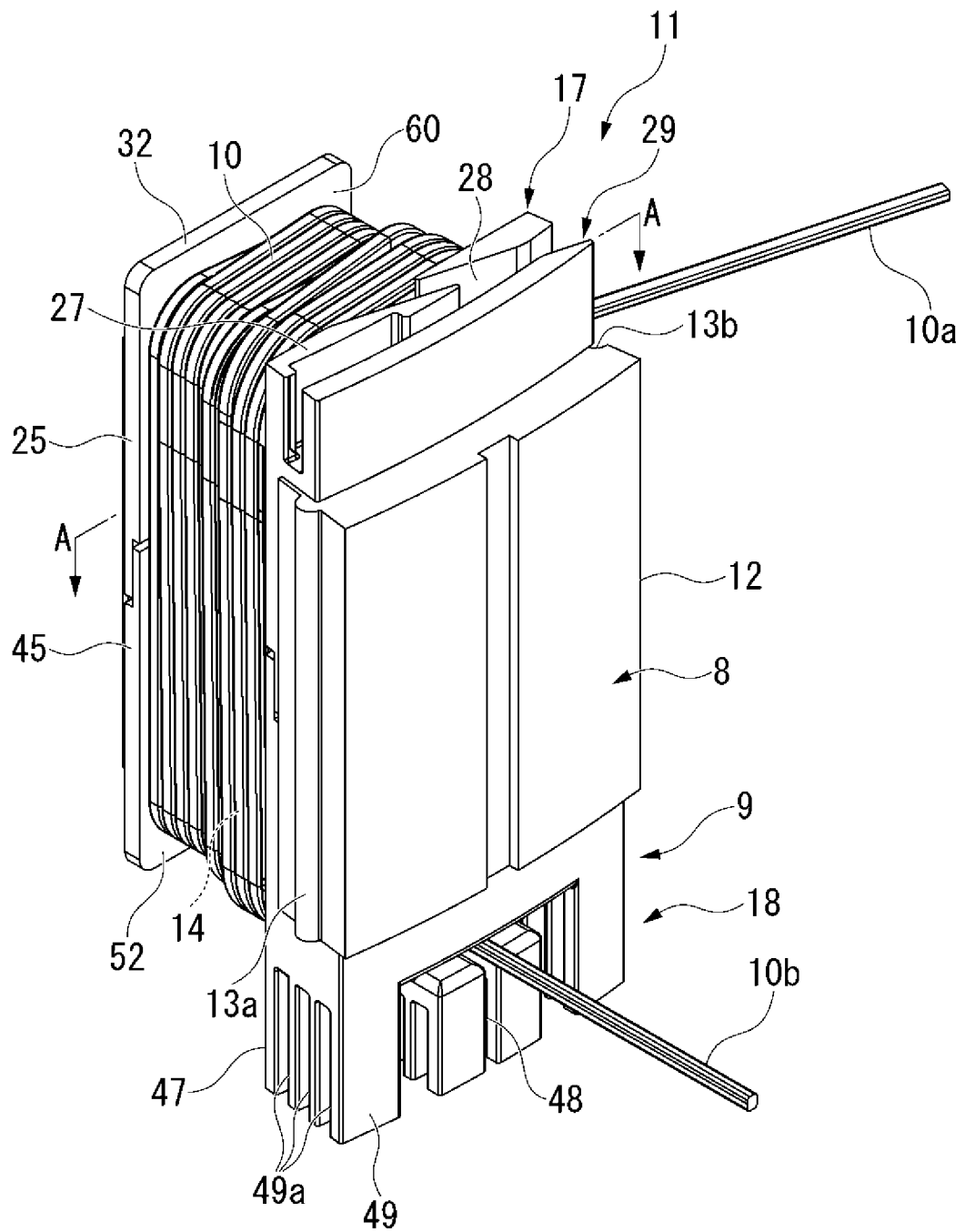
FIG. 2 is a perspective view showing a split stator according to the embodiment.
Figure 3:
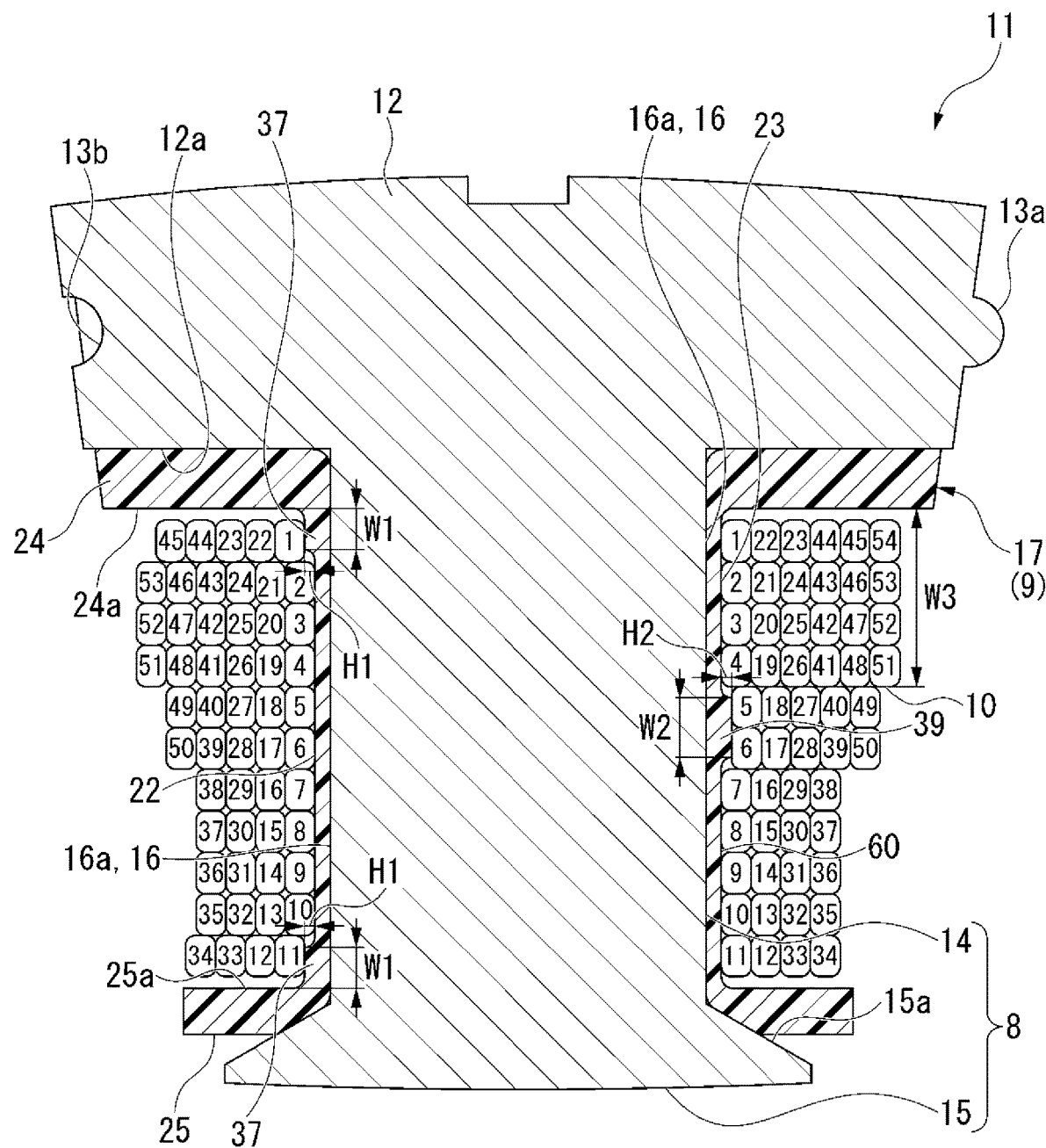
FIG. 3 is a cross-sectional view taken along line A-A of FIG. 2.

FIG. 2 is a perspective view showing the split stator 11. FIG. 3 is a cross-sectional view taken along line A-A of FIG. 2.

As shown in FIGS. 2 and 3, the split stator 11 includes a split core 12 separated from the stator core 7. The split core 12 extends in the circumferential direction. The split core 12 is configured by, for example, stacking a plurality of metal plates in layers or pressure forming soft magnetic powder.

The split core 12 is a portion that forms a ring-shaped magnetic path of the stator core 7 when the split stators 11 are coupled in a ring shape. The split core 12 is formed such that a cross-sectional shape thereof in a direction orthogonal to the axial direction is a circular-arc shape.

Connection portions 13a and 13b are formed at both end portions of the split core 12 in the circumferential direction. Two split cores 12 adjacent to each other are coupled by the connection portions 13a and 13b. Specifically, the two split cores 12 are coupled by pressing the connection portion 13a of one of the split cores (first split core) of the two split cores 12 adjacent to each other into the connection portion 13b of the other of the split cores (second split core). The connection portion 13a (first connection portion) which is one of the two connection portions 13a and 13b is formed in a projected shape. The connection portion 13b (second connection portion) which is the other of the two connection portions 13a and 13b is formed in a recessed shape capable of receiving the connection portion 13a. The split core 12 having the above-described configuration includes the teeth 8. The teeth 8 are formed so as to protrude in a radially inward direction from a center position of the split core 12 in the circumferential direction.

The teeth 8 include: a teeth main body 14 that extends in the radial direction; and a flange portion 15. The flange portion 15 is located at an end portion on the inner side of the teeth main body 14 in the radial direction. The flange portion 15 is shaped integrally with the teeth main body 14. The flange portion 15 extends to both sides in the circumferential direction at an edge portion of the teeth main body 14.

Accordingly, a coil accommodation recess 16a surrounded by the teeth main body 14, the flange portion 15, and the split core 12 (inner-side surface 12a of the split core 12 described below) is formed. A number of windings of the coil 10 (rectangular wire) is wound around the coil accommodation recess 16a. The coil accommodation recess 16a forms a slot 16 that is formed between the teeth 8 adjacent to each other in the circumferential direction in the stator 2.

The insulator 9 is configured of a first insulator 17 and a second insulator 18. The first insulator 17 and the second insulator 18 are separable from or coupleable to each other in the axial direction of the teeth 8.

The first insulator 17 is attached to the teeth 8 by moving in one direction (for example, a direction from the upper side of the teeth 8 to the lower side) of the axial direction of the teeth 8.

The second insulator 18 is attached to the teeth 8 by moving in the other direction (for example, a direction from the lower side of the teeth 8 to the upper side) of the axial direction of the teeth 8.

That is, the insulator 9 has a separate configuration in which two insulators are separable in the axial direction.

In a state in which the insulator 9 is attached to the teeth 8, the first insulator 17 and the second insulator 18 overlap each other without a gap. The teeth 8 are not exposed between the first insulator 17 and the second insulator 18. Although described in detail below, the coil 10 is wound around the teeth 8 to which the insulator 9 is attached. In a step of winding the coil 10 around the teeth 8, the coil 10 is initially wound around the first insulator 17 (start of winding). After the winding of the coil 10 with respect to the teeth 8 is completed, a winding-completion end of the coil 10 is drawn out from the second insulator 18.

In other words, the coil 10 is wound around the teeth 8 N times. Here, N is an integer greater than or equal to two. N times means multiple times. That is, the coil 10 is wound around the teeth 8 with the number of windings of first winding to N-th winding. Furthermore, a first wound coil 10 is an initial winding portion (first winding portion) formed by a first winding in consideration of a step of winding the coil 10 around the teeth 8. The N-th wound coil 10 is a final winding portion (N-th winding portion) formed by N-th winding. Note that, as described below, N times of the embodiment is, for example, fifty-three times. Note that, although there is a term "fifty-fourth winding of the coil 10" in the following description, the fifty-fourth winding of the coil 10 is a coil that is not completely wound around the teeth 8 by an amount of one winding.

Figure 4:
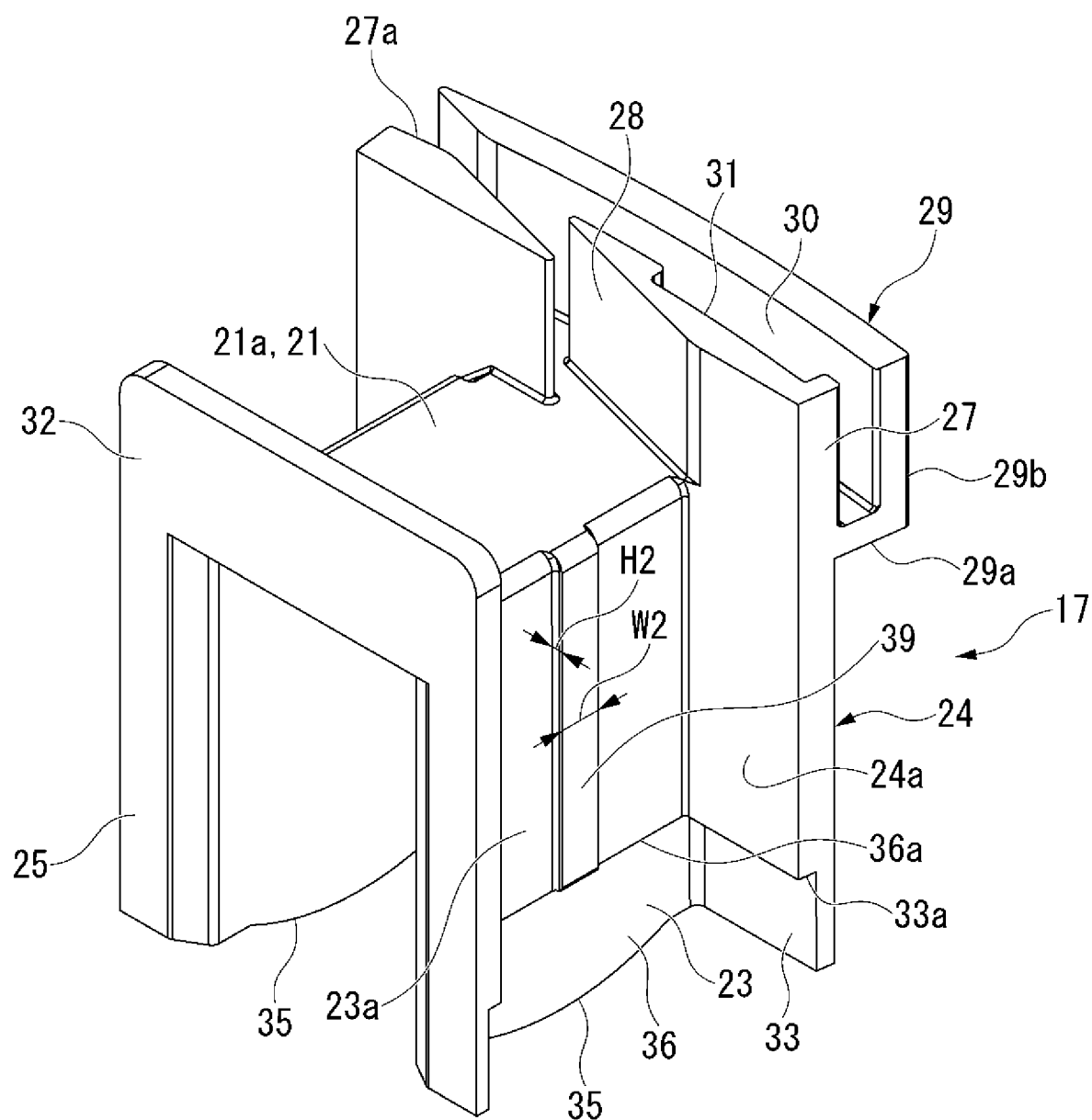
FIG. 4 is a perspective view showing a first insulator according to the embodiment when viewed from one side.
Figure 5:
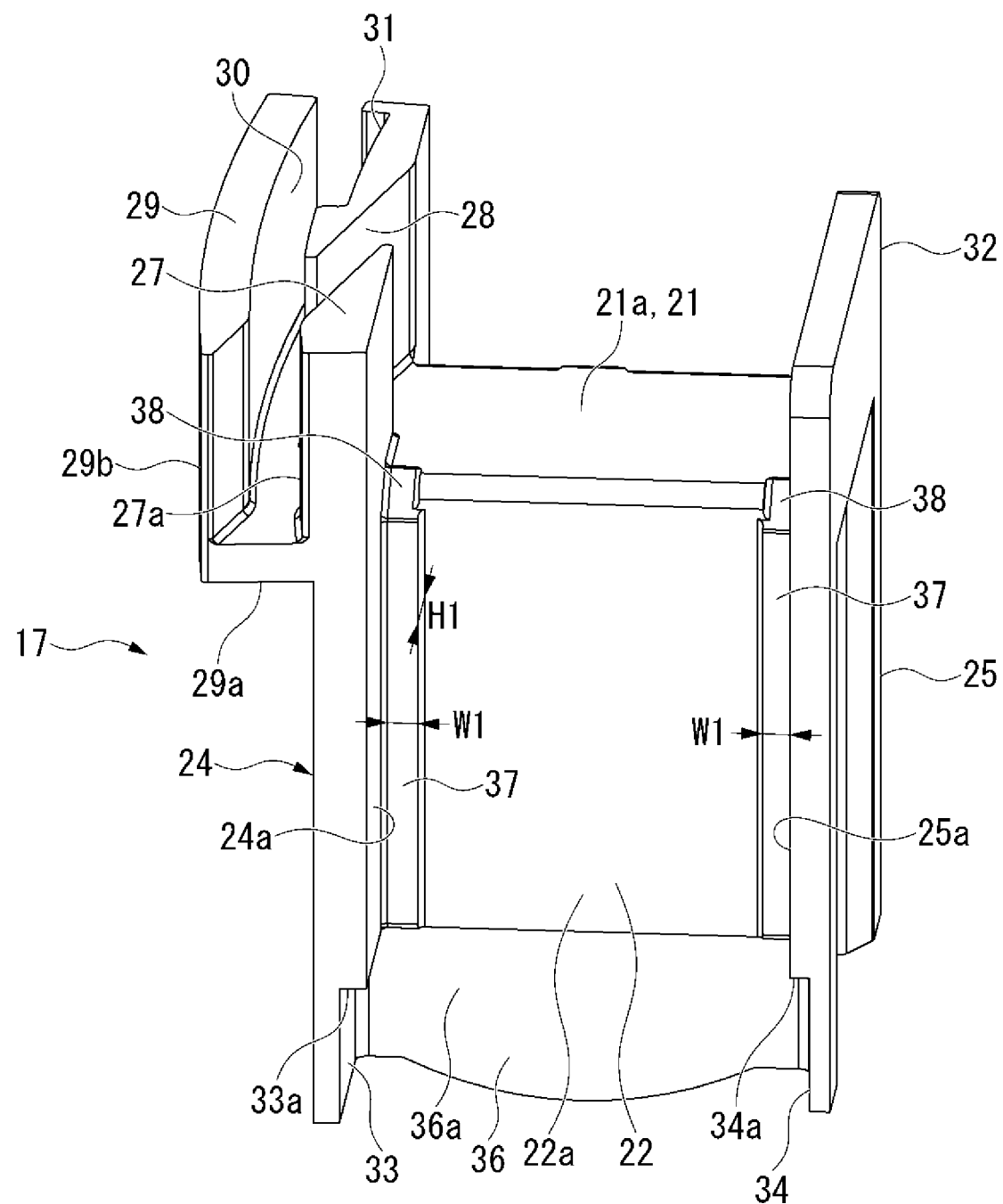
FIG. 5 is a perspective view showing the first insulator according to the embodiment when viewed from the other side.

FIG. 4 is a perspective view showing a first insulator 17 when viewed from one side. FIG. 5 is a perspective view showing a first insulator 17 when viewed from the other side.

As shown in FIGS. 3 to 5, the first insulator 17 includes: an end-surface cover portion 21 that covers one end surface (first teeth end surface) of the teeth 8 in the axial direction; two side-surface cover portions 22 and 23 (a first side-surface cover portion 22 and a second side-surface cover portion 23) that cover both side surfaces of the teeth 8 in the circumferential direction; an outer-wall portion 24 (first wall portion) that is shaped integrally with an outer end of each of the cover portions 21 to 23 in the radial direction; and an inner-wall portion 25 (second wall portion) that is shaped integrally with an inner end of each of the cover portions 21 to 23 in the radial direction. The second side-surface cover portion 23 is located on the side opposite to the first side-surface cover portion 22 of the first insulator 17.

The outer-wall portion 24 covers the inner side surface 12*a* of the split core 12. An outer-receiving recess 33 is formed via a stepped portion 33*a* on an inner-side surface 24*a* of the outer-wall portion 24 at a lower position in FIGS. 4 and 5. The outer-receiving recess 33 is formed at a position at which the first insulator 17 and the second insulator 18 are connected.

The outer-receiving recess 33 is a recess that receives the second insulator 18. The outer-receiving recess 33 overlaps the second insulator 18 in the radial direction.

The outer-wall portion 24 is provided so as to rise up from one end in the radial direction of the end-surface cover portion 21 and the side-surface cover portions 22 and 23 (a position at the outer side in the radial direction) in the axial direction of the teeth 8.

Furthermore, the outer-wall portion 24 includes an outer-wall protruding portion 27 that protrudes from one end surface of the split core 12 in the axial direction. A coil-introduction slit 28 is formed at a center of the outer-wall protruding portion 27 in the circumferential direction. The coil-introduction slit 28 is a groove that guides the coil 10 from the outer side into the inner side of the outer-wall portion 24 in the radial direction.

The direction of guiding the coil 10 from the outer side into the inner side of the outer-wall portion 24 in the radial direction is along a winding direction of winding the coil 10. In other words, the coil 10 guided by the coil-introduction slit 28 is the first wound coil 10, and is the initial winding portion formed by the first winding.

The coil-introduction slit 28 is formed to extend at an angle when viewed from the axial direction and to intersect with the radial direction and the circumferential direction. More specifically, the coil-introduction slit 28 extends at an angle in a direction from the outer side to the inner side in the radial direction, and extends in a direction from the first side-surface cover portion 22 to the second side-surface cover portion 23. In other words, the coil-introduction slit 28 extends in a direction inclined with respect to a direction from the first side-surface cover portion 22 to the second side-surface cover portion 23. The outer end of the coil-introduction slit 28 in the radial direction and the inner end thereof in the radial direction open. That is, an opening of the inner end in the radial direction is disposed closer to the second side-surface cover portion 23 than an opening of the outer end of the coil-introduction slit 28 in the radial direction.

A coil-pressing wall 29 is formed on an outer-side surface 27*a* of the outer-wall protruding portion 27. The coil-pressing wall 29 houses the coil 10 (crossover wire) drawn around the outer side of the outer-wall portion 24 in the radial direction. The coil-pressing wall 29 has a bottom wall portion 29*a* and a side wall portion 29*b*. The bottom wall portion 29*a* protrudes from a base (a position of the outer-wall portion 24 close to one end surface of the split core 12 in the axial direction) of the outer-wall protruding portion 27 in the radially outward direction. The side wall portion 29*b* is provided upright from an outer end of the bottom wall portion 29*a* in the radial direction in parallel to the outer-wall protruding portion 27. A crossover-wire storage portion 30 that accommodates a crossover-wire portion of the coil 10 is formed of the bottom wall portion 29*a*, the side wall portion 29*b*, and the outer-wall protruding portion 27 which are mentioned above. A recess 31 is formed at a part of the outer-side surface 27*a* of the outer-wall protruding portion 27 forming the crossover-wire storage portion 30. The recess 31 is disposed so as to avoid the coil-introduction slit 28. The recess 31 is formed in a quadrangular shape when viewed from the axial direction.

The inner-wall portion 25 covers an inner-side surface 15*a* (outer side surface in the radial direction) of the flange portion 15 forming the teeth 8. An inner-receiving recess 34 is formed via a stepped portion 34*a* on an inner-side surface 25*a* of the inner-wall portion 25 at a lower position in FIGS. 4 and 5. The inner-receiving recess 34 is formed at a position at which the first insulator 17 and the second insulator 18 are connected.

The inner-receiving recess 34 is a recess that receives the second insulator 18. The inner-receiving recess 33 overlaps the second insulator 18 in the radial direction.

The inner-wall portion 25 is provided so as to rise up from the other end in the radial direction of the end-surface cover portion 21 and the side-surface cover portions 22 and 23 (a position at the inner side in the radial direction) in the axial direction of the teeth 8.

Furthermore, the inner-wall portion 25 includes an inner-wall protruding portion 32 that protrudes from one end surface of the flange portion 15 in the axial direction. A protruding height of the inner-wall protruding portion 32 protruding from the flange portion 15 is substantially the same as a protruding height of the outer-wall protruding portion 27 protruding from the split core 12.

A receiving recess 36 is formed via a stepped portion 36*a* on outer-side surfaces 22*a* and 23*a* of the two side-surface cover portions 22 and 23 at a lower position in FIGS. 4 and 5. The receiving recess 36 is formed at a position at which the first insulator 17 and the second insulator 18 are connected.

The receiving recess 36 is a recess that receives the second insulator 18. The receiving recess 36 overlaps the second insulator 18 in the radial direction. The stepped portion 33*a* of the receiving recess 33, the stepped portion 34*a* of the receiving recess 34, and the stepped portion 36*a* of the receiving recess 36 have the same height and are smoothly continued.

Furthermore, a guide 35 (guide piece) extending toward the second insulator 18 is formed on a most of the region of the receiving recess 36 at a center in the radial direction. The guide 35 extends downward in FIGS. 4 and 5. The guide 35 functions as a guide when guiding the second insulator 18 into each of the receiving recesses 33, 34, and 36. A side edge of the guide 35 facing the second insulator 18 is curved in a projected shape projecting toward the second insulator 18.

A protruding-stripe portion 37 that protrudes from the first side-surface cover portion 22 is formed on the first side-surface cover portion 22 of the two side-surface cover portions 22 and 23. Specifically, the protruding-stripe portion 37 (first protruding-stripe portion) is formed at an end portion of the first side-surface cover portion 22 connected to the outer-wall portion 24. The protruding-stripe portion 37 (second protruding-stripe portion) is formed at an end portion of the first side-surface cover portion 22 connected to the inner-wall portion 25. The protruding-stripe portion 37 is formed on a region between a position on the same surface as a top surface 21a of the end-surface cover portion 21 and a position on the same surface as the stepped portion 36a of the receiving recess 36. The protruding-stripe portion 37 extends in the axial direction. A coil-accommodating recess portion 38 (recess) is formed at a side edge of the protruding-stripe portion 37 located on the end-surface cover portion 21 and at the top surface 21a of the end-surface cover portion 21. The coil-accommodating recess portion 38 is formed across the protruding-stripe portion 37 and the end-surface cover portion 21. The coil-accommodating recess portion 38 has a shape such that a corner of the protruding-stripe portion 37 and a part of the top surface 21a of the end-surface cover portion 21 are flat-chamfered. A protruding height H1 of the protruding-stripe portion 37 and a width W1 in the radial direction will be particularly described below.

A height-raising portion 39 is formed at a center in the radial direction on the second side-surface cover portion 23 of the two side-surface cover portions 22 and 23. The height-raising portion 39 is also formed on a region between a position on the same surface as a top surface 21a of the end-surface cover portion 21 and a position on the same surface as the stepped portion 36a of the receiving recess 36. The height-raising portion 39 extends in the axial direction. A protruding height H2 of the height-raising portion 39 and a width W2 in the radial direction will be particularly described below.

Figure 6:
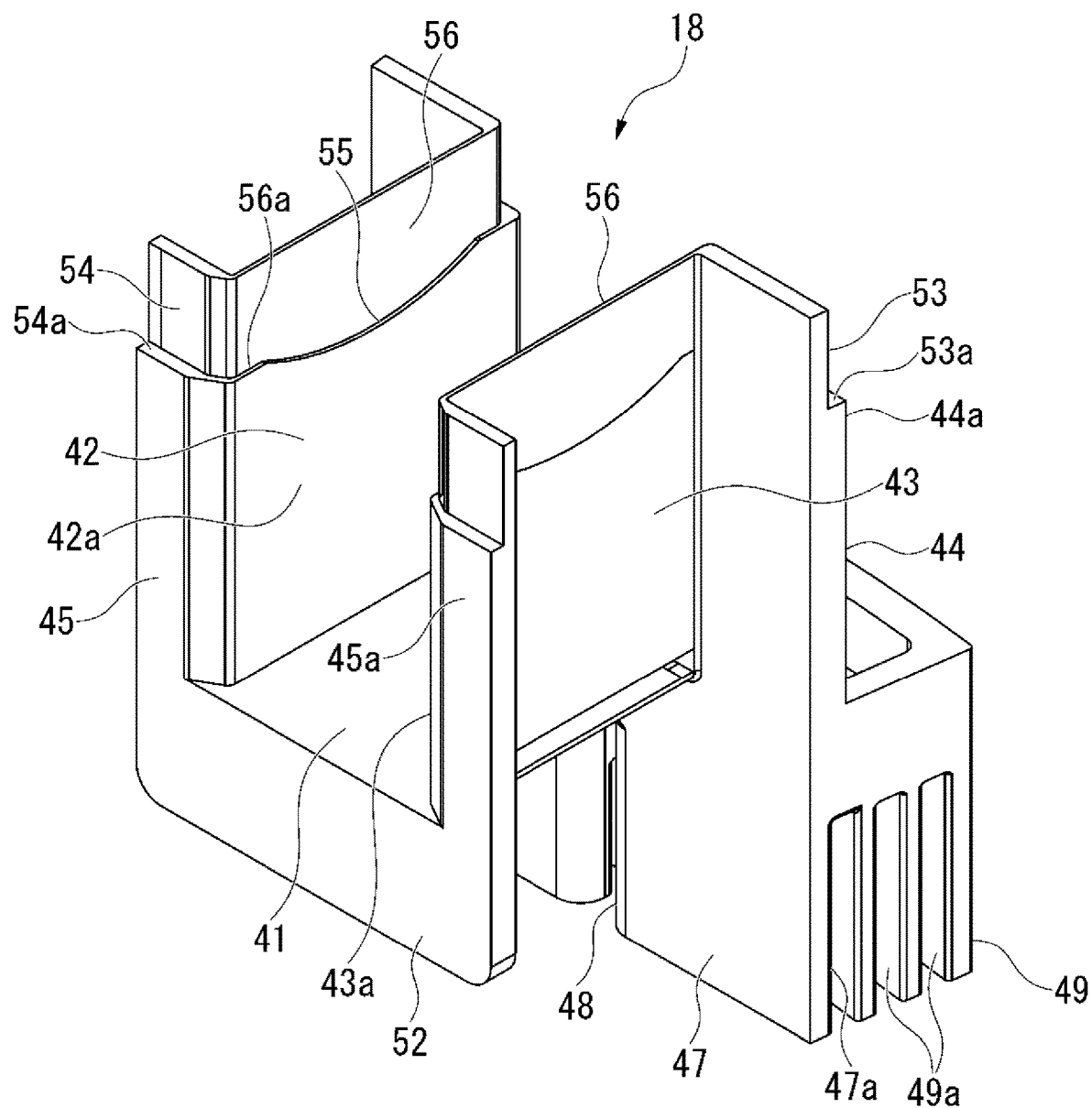
FIG. 6 is a perspective view showing a second insulator according to the embodiment when viewed from the inner side in a radial direction.

FIG. 6 is a perspective view showing the second insulator 18 when viewed from the inner side in the radial direction.

As shown in FIGS. 2 and 6, the second insulator 18 includes: an end-surface cover portion 41 that covers the other end surface (second teeth end surface) of the teeth 8 in the axial direction; two side-surface cover portions 42 and 43 (a first side-surface cover portion 42 and a second side-surface cover portion 43) that cover both side surfaces of the teeth 8 in the circumferential direction; an outer-wall portion 44 that is shaped integrally with an outer end of each of the cover portions 41 to 43 in the radial direction; and an inner-wall portion 45 that is shaped integrally with an inner end of each of the cover portions 41 to 43 in the radial direction.

The outer-wall portion 44 covers the inner side surface 12a of the split core 12. An outer-receiving recess 53 is formed via a stepped portion 53a on an outer-side surface 44a of the outer-wall portion 44 at an upper position in FIG. 6. The outer-receiving recess 53 is formed at a position at which the first insulator 17 and the second insulator 18 are connected.

Furthermore, the outer-wall portion 44 includes an outer-wall protruding portion 47 that protrudes from the other end surface of the split core 12 in the axial direction. A coil-drawing slit 48 is formed at a center of the outer-wall protruding portion 47 in the circumferential direction. The coil 10 wound around the insulator 9 is drawn out through the coil-drawing slit 48.

The direction of drawing the coil 10 from the coil-drawing slit 48 toward a coil-guide portion 49 is along a winding direction of winding the coil 10. In other words, the coil 10 drawn out from the coil-drawing slit 48 to the coil-guide portion 49 is the N-th wound coil 10 and is the final winding portion formed by N-th winding.

The coil-guide portion 49 is formed on an outer-side surface 47a of the outer-wall protruding portion 47. The coil-guide portion 49 houses the coil 10 (crossover wire) drawn around the outer side of the outer-wall portion 44 in the radial direction. The coil-guide portion 49 includes a plurality of guide grooves 49a (for example, three in the embodiment) extending in the circumferential direction. The three guide grooves 49a are arranged in parallel in the radial direction. The coil 10 for each phase is housed in each of the guide grooves 49a.

The inner-wall portion 45 covers the inner side surface 15a of the flange portion 15 forming the teeth 8 (a surface on the outer side in the radial direction). An inner-receiving recess 54 is formed via a stepped portion 54a on an outer-side surface 45a of the inner-wall portion 45 at an upper position in FIG. 6. The inner-receiving recess 54 is formed at a position at which the first insulator 17 and the second insulator 18 are connected.

Furthermore, the inner-wall portion 45 includes an inner-wall protruding portion 52 that protrudes from an end surface of the flange portion 15 in the axial direction. A protruding height of the inner-wall protruding portion 52 protruding from the flange portion 15 is substantially the same as a protruding height of the outer-wall protruding portion 47 protruding from the split core 12.

A receiving recess 56 is formed via a stepped portion 56a on inner-side surfaces 42a and 43a of the two side-surface cover portions 42 and 43 at an upper position in FIG. 6. The receiving recess 56 is formed at a position at which the first insulator 17 and the second insulator 18 are connected. The stepped portion 53a of the receiving recess 53, the stepped portion 54a of the receiving recess 54, and the stepped portion 56a of the receiving recess 56 have the same height and are smoothly continued.

Additionally, a recess 55 corresponding to the guide 35 of the first insulator 17 is formed on a most of region of the receiving recess 56 at a center in the radial direction.

In the foregoing configuration, the first insulator 17 and the second insulator 18 are attached to both ends of the teeth 8 in the axial direction so as to sandwich the teeth 8. In a state in which the first insulator 17 is attached to the second insulator 18, the recesses 53, 54, and 56 of the second insulator 18 are disposed on the inner sides of the recesses 33, 34, and 36 of the first insulator 17 in the radial direction. Accordingly, the entirety of the outer peripheral surfaces of the teeth main body 14 of the teeth 8, the entirety of the inner side surface 12a of the split core 12, and the entirety of the inner side surface 15a of the flange portion 15 are covered with the insulators 17 and 18 without a gap. Moreover, due to the recesses 33, 34, 36, 53, 54, and 56, a thickness of the portion at which the insulators 17 and 18 overlap each other is prevented from being larger than a thickness of the other portion.

The insulators 17 and 18 attached to the teeth 8 form a coil-winding-accommodating recess portion 60 by the end-surface cover portions 21 and 41, the side-surface cover portions 22 to 43, the outer-wall portions 24 and 44, and the inner-wall portions 25 and 45 (refer to FIG. 2). The coil 10 is wound around the insulator 9 attached to the teeth 8 by a concentrated winding method such that the coil 10 is accommodated in the coil-winding-accommodating recess portion 60.

Next, a step of winding the coil 10 will be described with reference to FIGS. 2 and 3.

As shown in FIGS. 2 and 3, the coil 10 is a so-called rectangular wire having a rectangular cross-sectional shape. The above-described coil 10 of the rectangular wire is wound and aligned without a gap such that a longitudinal direction thereof is along the radial direction and a short-side direction thereof is along the circumferential direction. Note that, numbers corresponding to winding numbers of the coil 10 are represented in FIG. 3. That is, of the coil 10 wound around the teeth 8 attached to the insulator 9, for example, the coil 10 represented by "1" is the coil 10 firstly wound, and is the first winding portion. In other words, in the embodiment, the coil 10 has the first winding portion to fifty-third winding portion.

In the step of winding the coil 10 around the teeth 8 as described above, the coil 10 is firstly wound around the first insulator 17 (start of winding). After the winding of the coil 10 with respect to the teeth 8 is completed, a winding-completion end of the coil 10 is drawn out from the second insulator 18.

More specifically, the coil 10 is attracted to the inside of the coil-winding-accommodating recess portion 60 through the coil-introduction slit 28 formed in the first insulator 17. Thereafter, the coil 10 passes the end-surface cover portion 21 of the first insulator 17 and is drawn to the side of the second side-surface cover portion 23, and one winding is carried out at the position closest to the split core 12 (outer-wall portions 24 and 44). That is, the coil 10 is drawn so as to pass the end-surface cover portion 41 of the second insulator 18 from the second side-surface cover portion 23 until reaching the first side-surface cover portion 22 of the first insulator 17, and a first winding step of the coil 10 is completed.

Here, the coil-introduction slit 28 extends in a direction from the first side-surface cover portion 22 to the second side-surface cover portion 23 while extending at an angle in a direction from the outer side to the inner side in the radial direction. Consequently, it is possible to smoothly guide the coil 10 into the second side-surface cover portion 23.

Note that, in the following description, the coil 10 wound around the teeth 8 by a winding step of each time is referred to as a corresponding ordinal numbered coil 10. That is, for example, the coil 10 of the first winding step is referred to as a first winding of the coil 10. In other words, a first winding portion is formed by the first winding step.

Thereafter, the first winding of the coil 10 is wound while being shifted by an amount of one coil 10 in a direction toward the inner side in the radial direction (toward the flange portion 15). That is, the coil 10 is wound at an angle while being shifted by an amount of one coil 10 when being bridged from the first side-surface cover portion 22 to the second side-surface cover portion 23.

Here, the protruding-stripe portion 37 is formed on the outer side surface 22*a* of the first side-surface cover portion 22. The protruding-stripe portion 37 is formed at the position close to the outer-wall portion 24 (inner side surface 24*a*) on the outer side surface 22*a*. The width W1 of the protruding-stripe portion 37 in the radial direction is substantially the same as a width in the longitudinal direction of the coil 10. Additionally, the protruding height H1 of the protruding-stripe portion 37 is substantially a half of a width of the coil 10 in the short-side direction. Consequently, on the first side-surface cover portion 22, the first winding of the coil 10 is disposed so as to be shifted by a substantially half-height of the coil 10 in the short-side direction with respect to a second and subsequent winding of the coil 10.

Furthermore, on the side edge of the protruding-stripe portion 37 located on the end-surface cover portion 21 and on the top surface 21*a* of the end-surface cover portion 21, the coil-accommodating recess portion 38 is formed across the protruding-stripe portion 37 and the end-surface cover portion 21. The first-wound coil 10 is accommodated in the coil-accommodating recess portion 38. As the first-wound coil 10 is caught by the inner-side surface of the coil-accommodating recess portion 38, the position of the first winding of the coil 10 is prevented from being displaced when transition from the first winding step to a second winding step is carried out.

Moreover, the height-raising portion 39 is formed at the center in the radial direction on the second side-surface cover portion 23. A width W3 between the height-raising portion 39 and the outer-wall portion 24 is a width in which four coils 10 are to be accommodated. The width W2 of the height-raising portion 39 in the radial direction is substantially slightly smaller than a width of two coils 10 in the longitudinal direction. The protruding height H2 of the height-raising portion 39 is substantially a half of a width of the coil 10 in the short-side direction. Accordingly, on the second side-surface cover portion 23, the coil 10 is disposed on the height-raising portion 39 when transition from a fourth winding step to a fifth winding step is carried out and when transition from a fifth winding step to a sixth winding step is carried out. On the second side-surface cover portion 23, a fifth and a sixth winding of the coil 10 are disposed so as to be shifted by a substantially half-height of the coil 10 in the short-side direction with respect to a fourth, a seventh, and subsequent winding of the coil 10.

An eleventh winding of the coil 10 is disposed at the position (inner-wall portions 25 and 45) closest to the flange portion 15 in the coil-winding-accommodating recess portion 60. Since the protruding-stripe portion 37 is formed on the first side-surface cover portion 22 at an end portion of the inner-wall portion 25, a tenth winding of the coil 10 is disposed so as to be shifted by a substantially half-height of the coil 10 in the short-side direction with respect to the eleventh and subsequent winding of the coil 10 on the first side-surface cover portion 22.

A winding step of a twelfth winding of the coil 10 is carried out on the eleventh winding of the coil 10. Next, winding steps of twelfth and subsequent winding of the coil 10 are sequentially carried out so as to return to the split core 12 (outer-wall portions 24 and 44). A twenty-second winding of the coil 10 is disposed again at the position (inner-wall portions 25 and 45) closest to the split core 12 (outer-wall portions 24 and 44) in the coil-winding-accommodating recess portion 60. A winding step of a twenty-third winding of the coil 10 is carried out on the twenty-second winding of the coil 10. Thereafter, winding steps of the coil 10 are carried out again so as to reciprocally move in the radial direction.

In a space of the coil accommodation recess 16*a* (the slot 16), when the number of the winding steps of the coil 10 reaches fifty times, the coil 10 is turned back so as to return to the split core 12 (outer-wall portions 24 and 44), and winding steps are carried out.

Here, a winding position of a fiftieth winding of the coil 10 is substantially a center of the coil-winding-accommodating recess portion 60 in the radial direction. More specifically, the position at which the height-raising portion 39 is formed is the winding position of the fiftieth winding of the coil 10. A forty-ninth winding of the coil 10 and the fiftieth winding of the coil 10 are disposed at the position at which the height-raising portion 39 is formed.

The coil 10 turned back at the fiftieth time is disposed next to the forty-ninth winding of the coil 10. On the second side-surface cover portion 23, the height-raising portion 39 causes the forty-ninth winding of the coil 10 to be disposed so as to be shifted by a substantially half-height of the coil 10 in the short-side direction with respect to a forty-eighth winding of the coil 10. That is, the forty-ninth winding of the coil 10 protrudes from the forty-eighth winding of the coil 10 by an amount of a substantially half-height of the coil 10 in the short-side direction. Accordingly, as a fifty-first winding of the coil 10 is caught at a protruding portion of the forty-ninth winding of the coil 10, positioning thereof is simply carried out.

The position at which the fifty-fourth winding of the coil is drawn around the second side-surface cover portion 23 is the position closest to the split core 12 (outer-wall portions 24 and 44) in the coil-winding-accommodating recess portion 60. The fifty-fourth winding of the coil 10 is drawn out to the outer side in the radial direction through the coil-drawing slit 48 of the second insulator 18 without being drawn around the first side-surface cover portion 22. The portion drawn out from the coil-drawing slit 48 is a winding-completion end of the coil 10. Consequently, a winding operation of the coil 10 is completed.

Here, since the fifty-fourth winding of the coil 10 is a coil that is not completely wound around the teeth 8 by an amount of one winding, a gap (hereinbelow, referred to as a remaining gap) corresponding to an amount of one of the coils 10 occurs between a fifty-third winding of the coil 10 and the outer-wall portions 24 and 44 on the first side-surface cover portion 22. However, since the protruding-stripe portion 37 is formed on the first insulator 17, a forty-fifth winding of the coil 10 protrudes to the remaining gap by an amount of a substantially half-height of the coil 10 in the short-side direction. Since the coil 10 is caught by the protruding portion, the fifty-third winding of the coil 10 is prevented from being shifted to the remaining gap side.

Terminal portions of the coils 10, each of which is drawn out from both ends of the split stator 11 in the axial direction, are connected to each other. In the embodiment, the rotating electric machine 1 is configured of coils with three phases (U-phase, V-phase, and W-phase), and the coils 10 are star-connected (Y-connection). For example, a terminal portion 10a (refer to FIG. 2, winding-start end) of the coil 10 drawn out through the coil-introduction slit 28 of the first insulator 17 is connected to a neutral point. A terminal portion 10b (refer to FIG. 2, winding-completion end) of the coil 10 drawn out through the coil-drawing slit 48 of the second insulator 18 is connected to a terminal, which is not shown in the drawings, with a phase corresponding to the same phase coils connected to each other.

As stated above, the terminal portion 10b (winding-completion end) of the coil 10 connected to the terminal, which is not shown in the drawings, and the terminal portion 10a (winding-start end) of the coil 10 connected to the neutral point are separately arranged at both sides in the axial direction with the stator core 7 interposed therebetween. The terminal portion 10a of the coil 10 connected to the neutral point is accommodated in the crossover-wire storage portion 30 of the first insulator 17 and is drawn thereto. The terminal portion 10b of the coil 10 connected to the terminal, which is not shown in the drawings, is drawn such that the same phase coils 10 are housed in the respective guide grooves 49a of the second insulator 18.

When electric power is supplied to a desired coil 10 via the terminals, which are not shown in the drawings, a desired interlinkage magnetic flux is formed in the stator 2. A magnetic suction force or a magnetic repulsion force is generated between the interlinkage magnetic flux and a magnet of the rotor 3, which is not shown in the drawings, and the rotor 3 rotates.

As mentioned above, in the above-described embodiment, the insulator 9 (the first insulator 17 and the second insulator 18) that is attached to the teeth 8 and achieves insulation between the teeth 8 and the coil 10 is provided. The insulator 9 includes: the end-surface cover portions 21 and 41 that cover the end surface of the teeth 8 in the axial direction; the side-surface cover portions 22 to 43 that cover both side surfaces of the teeth 8 in the circumferential direction; and the outer-wall portions 24 and 44 and the inner-wall portions 25 and 45 which are provided upright from the end-surface cover portions 21 and 41 and the side-surface cover portions 22 to 43.

The two protruding-stripe portions 37 are formed on the first side-surface cover portion 22 of the first insulator 17. Additionally, the coil-accommodating recess portion 38 is formed so as to bridge the protruding-stripe portion 37 and the end-surface cover portion 21. The coil-accommodating recess portion 38 can prevent the position of the coil 10 from being displaced in the middle of the winding step.

Furthermore, as the coil-accommodating recess portion 38 is formed at the portion at which the protruding-stripe portion 37 is formed, the thickness of the portion of the insulator 9 at which the coil-accommodating recess portion 38 is formed can be prevented from being thin. Since it is not necessary to unnecessarily increase the thickness of the first side-surface cover portion 22 or the end-surface cover portion 21 in order to form the coil-accommodating recess portion 38, it is possible to improve a space factor of the coil 10 (a proportion of a conductor to a cross-sectional surface of a coil).

Furthermore, by forming the protruding-stripe portion 37, the position of the coil 10 wound around the upper part of the protruding-stripe portion 37 can be displaced from the position of the coil 10 of another winding step. By using the protruding portion of the displaced coil 10, it is also possible to prevent displacement of the position of the coil 10 wound around the teeth 8 by another winding step.

Moreover, of the first side-surface cover portion 22, the protruding-stripe portion 37 is formed at the end portion of the outer-wall portion 24 and the end portion of the inner-wall portion 25. Therefore, in the particular case in which the terminal portions of the coils 10 are separately drawn out from both ends of the teeth 8 in the axial direction, it is possible to reliably prevent the position of the coil 10 from being displaced. In the embodiment, it is possible to reliably prevent the position of the fifty-third winding of the coil 10 from being displaced.

The protruding height H1 of the protruding-stripe portion 37 is substantially a half of the width of the coil 10 in the short-side direction. For this reason, there is no possibility that the coil 10 wound around the upper part of the protruding-stripe portion 37 is completely displaced by an amount of one coil, and it is possible to reliably prevent the position of the coil 10 from being displaced. For example, in a case in which displacement due to the protruding-stripe portion 37 by an amount of one coil occurs, there is no catching between the coils 10 adjacent to each other, and displacement of the coil 10 by use of the protruding-stripe portion 37 cannot be prevented. According to the aforementioned embodiment, it is possible to solve this problem.

On the first side-surface cover portion 22, the protruding-stripe portion 37 formed at the end portion of the outer-wall portion 24 is disposed at the position at which the first winding step of the coil 10 is completed. In other words, the protruding-stripe portion 37 is disposed at the position of the first wound coil 10. Therefore, when the second winding step of the coil 10 is carried out, it is possible to reliably prevent the position of the first winding of the coil 10 from being displaced. Additionally, the height-raising portion 39 is formed on the second side-surface cover portion 23 facing the first side-surface cover portion 22 in the circumferential direction. That is, the height-raising portion 39 is formed on the second side-surface cover portion 23 around which the coil 10 is finally drawn in the winding steps of the coil 10. The width W3 between the height-raising portion 39 and the outer-wall portion 24 is a width in which four coils 10 are to be accommodated. Particularly, the width W3 between the height-raising portion 39 and the outer-wall portion 24 is substantially four times the width of the coil 10 in the longitudinal direction. Therefore, it is possible to align the coil 10 between the height-raising portion 39 and the outer-wall portion 24 without a gap. Furthermore, even in a case of winding the coil 10 so as to be turned back at the muddle of the coil-winding-accommodating recess portion 60 in the radial direction, it is possible to reliably prevent the position of the coil 10 from being displaced. That is, in the embodiment, when transitioning from the fiftieth winding step to the fifty-first winding step, it is possible to reliably prevent the position of the coil 10 from being displaced.

The protruding height H2 of the height-raising portion 39 is substantially a half of a width of the coil 10 in the short-side direction. For this reason, there is no possibility that the coil 10 wound around the upper part of the height-raising portion 39 is completely displaced by an amount of one coil, and it is possible to reliably prevent the position of the coil 10 from being displaced.

According to at least one embodiment described above, the protruding-stripe portion 37 is formed at the end portion of the outer-wall portion 24 and the end portion of the inner-wall portion 25 on the first side-surface cover portion 22 of the first insulator 17. Additionally, the coil-accommodating recess portion 38 is formed so as to bridge the protruding-stripe portion 37 and the end-surface cover portion 21. Consequently, it is possible to prevent the position of the coil 10 formed of a rectangular wire from being displaced in the middle of the winding step.

Note that, in the above-described embodiment, a case was described in which the stator 2 (stator core 7) is configured such that the split stators 11 are coupled in a ring form. A case was described in which the number of the split stators 11 is twenty-four. However, the embodiment is not limited to this configuration. A system may not be adopted in which the stator 2 (stator core 7) is separable in the circumferential direction.

In the aforementioned embodiment, a case was described in which the protruding height H1 of the protruding-stripe portion 37 and the protruding height H2 of the height-raising portion 39 are substantially a half of a width of the coil 10 in the short-side direction. However, the embodiment is not limited to this configuration. Each protruding height H1 needs to be smaller than the width of the coil 10 in the short-side direction.

In the above-mentioned embodiment, a case was described in which the protruding-stripe portion 37 and the coil-accommodating recess portion 38 are formed on the first side-surface cover portion 22 of the first insulator 17 at the end portion of the outer-wall portion 24 and at the end portion of the inner-wall portion 25. However, the embodiment is not limited to this configuration. The protruding-stripe portion 37 and the coil-accommodating recess portion 38 need to be formed at at least one of the end portion of the outer-wall portion 24 and the end portion of the inner-wall portion 25 of the first side-surface cover portion 22.

In the aforementioned embodiment, a case was described in which the width W3 between the height-raising portion 39 and the outer-wall portion 24 is a width in which four coils 10 are to be accommodated. However, the embodiment is not limited to this configuration. The width W3 between the height-raising portion 39 and the outer-wall portion 24 may be an integral multiple of a width of the coil 10 in the longitudinal direction. With this configuration, it is possible to reliably align the coil 10 inside the coil-winding-accommodating recess portion 60.

In the above-mentioned embodiment, a case was described in which the coil-accommodating recess portion 38 has a shape such that a corner of the protruding-stripe portion 37 and a part of the top surface 21a of the end-surface cover portion 21 are flat-chamfered. However, the embodiment is not limited to this configuration. The coil-accommodating recess portion 38 may be formed by cutting a corner of the protruding-stripe portion 37 and a part of the top surface 21a of the end-surface cover portion 21.

In the aforementioned embodiment, a case was described in which the coil 10 is wound a total of fifty-four times around the teeth 8 to which the insulator 9 is attached. However, the embodiment is not limited to this configuration. The number of windings of the coil 10 may be optionally set. Additionally, a position at which the coil 10 is turned back at the middle of the coil-winding-accommodating recess portion 60 in the radial direction may be changed depending on the number of windings of the coil 10. The height-raising portion 39 needs to be formed in accordance with the turning-back position.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the inventions. The accompanying claims and their equivalents are intended to cover such forms or modifications as would fall within the scope of the inventions.

DESCRIPTION OF REFERENCE NUMERALS

1 . . . rotating electric machine, 2 . . . stator, 3 . . . rotor, 5 . . . rotor core, 8 . . . teeth, 9 . . . insulator, 10 . . . coil (rectangular wire), 17 . . . first insulator (insulator), 18 . . . second insulator (insulator), 21 . . . end-surface cover portion, 22 . . . first side-surface cover (side-surface cover), 23 . . . second side-surface cover (side-surface cover), 24 . . . outer-wall portion (first wall portion), 25 . . . inner-wall portion (second wall portion), 37 . . . protruding-stripe portion, 38 . . . coil-accommodating recess portion (recess), 39 . . . height-raising portion, H1, H2 . . . protruding height

The invention claimed is:
1. An insulator to be attached to teeth extending from one side surface in a radial direction of a ring-shaped stator core in the radial direction, the insulator ensuring insulation between the teeth and a rectangular wire wound around the teeth with a number of windings, the insulator comprising:
- an end-surface cover portion that covers an end surface of the teeth in an axial direction, the end-surface cover portion having an outer-end surface in the axial direction and a first end portion in the circumferential direction, the first end portion being on the outer-end surface;
- two side-surface cover portions that cover both side surfaces of the teeth in a circumferential direction;
- a first wall portion that is provided upright from one end of the radial direction of the end-surface cover portion and the two side-surface cover portions;
- a second wall portion that is provided upright from the other end of the radial direction of the end-surface cover portion and the two side-surface cover portions;
- a protruding-stripe portion that is formed to protrude from at least one of a side edge of the first wall portion and a side edge of the second wall portion, and extends in the axial direction, the protruding-stripe portion having a second end portion in the axial direction, the second end portion facing the first end portion; and
- a recess that is formed across the protruding-stripe portion and the end-surface cover portion, and accommodates the rectangular wire, wherein
- at one side-surface cover portion of the two side-surface cover portions,
- a first winding of the rectangular wire is disposed, the rectangular wire is wound around the teeth with a number of windings, and
- the protruding-stripe portion and the recess are formed, and wherein the recess is provided between the first end portion and the second end portion,
- the side-surface cover portion has an outer-side surface,
- the protruding-stripe portion is formed on the outer-side surface,
- the recess has an inner-side surface,
- the inner-side surface is depressed from a corner between the outer-side surface and the outer-end surface, and the inner-side surface catches the rectangular wire so as to accommodate the rectangular wire.

2. The insulator according to claim 1, wherein the protruding-stripe portion is formed at both a side edge of the first wall portion and a side edge of the second wall portion of the side-surface cover portion.

3. The insulator according to claim 1, wherein a protruding height of the protruding-stripe portion is smaller than a thickness of the rectangular wire in a short-side direction.

4. The insulator according to claim 1, wherein the two side-surface cover portions are a first side-surface cover portion and a second side-surface cover portion, at the first side-surface cover portion, the first winding of the rectangular wire is disposed, and the protruding-stripe portion and the recess are formed, the second side-surface cover portion includes a height-raising portion that is formed to protrude from the second side-surface cover portion, and extends in the axial direction, and a width between the height-raising portion and the first wall portion is an integral multiple of a width of the rectangular wire in the radial direction.

5. The insulator according to claim 4, wherein a protruding height of the height-raising portion is smaller than a thickness of the rectangular wire in a short-side direction.

6. The insulator according to claim 1, wherein a winding-start end and a winding-completion end of the rectangular wire are separately disposed at both sides of the teeth in the axial direction.

7. A stator comprising:
the insulator according to claim 1;
the teeth to which the insulator is attached; and
the stator core integrated with the teeth.

8. A rotating electric machine, comprising:
the stator according to claim 7; and
a rotor rotatably disposed with respect to the stator.

* * * * *